(12) United States Patent
Trinh

(10) Patent No.: US 12,469,024 B2
(45) Date of Patent: *Nov. 11, 2025

(54) DISTRIBUTED LEDGER TECHNOLOGY UTILIZING ASSET TRACKING

(71) Applicant: Wells Fargo Bank, N.A., San Francisco, CA (US)

(72) Inventor: Duc M. Trinh, Golden Valley, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,829

(22) Filed: Nov. 20, 2023

(65) Prior Publication Data

US 2024/0095722 A1    Mar. 21, 2024

Related U.S. Application Data

(63) Continuation of application No. 16/879,223, filed on May 20, 2020, now Pat. No. 11,823,180.

(51) Int. Cl.
*G06Q 20/36* (2012.01)
*G06Q 20/38* (2012.01)

(52) U.S. Cl.
CPC ..... *G06Q 20/3678* (2013.01); *G06Q 20/3674* (2013.01); *G06Q 20/382* (2013.01)

(58) Field of Classification Search
CPC ................. G06Q 20/00–425; G06Q 20/382
USPC ........................................................ 705/64
See application file for complete search history.

(56) References Cited

U.S. PATENT DOCUMENTS

| | | | |
|---|---|---|---|
| 10,013,573 B2 | 7/2018 | Dillenberger | |
| 11,044,098 B1* | 6/2021 | Thacker | H04L 9/3247 |
| 11,164,165 B1* | 11/2021 | Andreev | G06Q 20/02 |
| 11,823,180 B1* | 11/2023 | Trinh | G06Q 20/382 |
| 12,131,317 B2* | 10/2024 | Stipech | G06Q 20/3821 |
| 2015/0019362 A1* | 1/2015 | Chan | G06F 17/18 |
| | | | 705/26.2 |
| 2018/0189528 A1* | 7/2018 | Hanis | G06Q 30/0185 |
| 2020/0184431 A1* | 6/2020 | Sinmao | G06Q 20/223 |

(Continued)

FOREIGN PATENT DOCUMENTS

| | | |
|---|---|---|
| WO | WO-2018/195644 A1 | 11/2018 |
| WO | WO-2019/032113 A1 | 2/2019 |
| WO | WO-2019/162957 A1 | 8/2019 |

*Primary Examiner* — Chenyuh Kuo
(74) *Attorney, Agent, or Firm* — Foley & Lardner LLP

(57) ABSTRACT

Systems, methods and computer-readable storage media utilized to track a plurality of assets on a distributed ledger network. One method includes receiving a request to track a specific asset on the distributed ledger network. The method further includes identifying a reason for the exchange, wherein the reason for exchange is based on a set of predefined actions. The method further includes determining an asset type associated with the specific asset. The method further includes generating a unique identifier identifying the specific asset. The method further includes generating a unique tracking identifier, the unique tracking identifier including a subset of identifiers, the subset of identifiers including an asset issuer identifier, an asset type identifier, and the unique identifier. The method further includes providing, to the distributed ledger network, a cryptographic code and the reason for the exchange.

20 Claims, 9 Drawing Sheets

(56) References Cited

U.S. PATENT DOCUMENTS

2020/0326680 A1\* 10/2020 Wang .................... G06Q 10/087
2021/0182805 A1\* 6/2021 Benkreira ............ G06Q 20/367
2021/0281395 A1 9/2021 Narayanaswami et al.

\* cited by examiner

DISTRIBUTED LEDGER TECHNOLOGY UTILIZING ASSET TRACKING

CROSS-REFERENCE TO RELATED APPLICATIONS AND CLAIM OF PRIORITY

This application is a continuation of and claims priority to U.S. application Ser. No. 16/879,223 (now U.S. Pat. No. 11,823,180), titled "Distributed Ledger Technology Utilizing Asset Tracking," filed May 20, 2020, of which is incorporated herein by reference in its entirety and for all purposes.

BACKGROUND

The present disclosure relates generally to the field of distributed ledger technology (DLT). In a computer networked environment such as the internet, users and entities such as people or companies exchange assets on distributed ledger networks.

SUMMARY

Some arrangements relate to a method for tracking a plurality of assets on a distributed ledger network, the method implemented by an asset issuer computing device. The method includes receiving a request to track a specific asset on the distributed ledger network, the request includes a dataset associated with the specific asset. Further, the method includes determining an asset type associated with the specific asset based on the dataset. Further, the method includes generating a unique identifier identifying the specific asset. Further, the method includes generating a unique tracking identifier, the unique tracking identifier including a subset of identifiers, the subset of identifiers including an asset issuer identifier, an asset type identifier, and the unique identifier. Further, the method includes providing, to the distributed ledger network, the unique tracking identifier, the specific asset, and the dataset associated with the specific asset and receiving, from the distributed ledger network, a confirmation notification indicating a successful association of the unique tracking identifier with the specific asset.

In some arrangements, the method further includes receiving a notification indicating an exchange of the unique tracking identifier off the distributed ledger network and including a reason for the exchange. Further, the method includes identifying the reason for the exchange, wherein the reason for exchange is based on a set of predefined actions and providing, by the asset issuer computing device to the distributed ledger network, the unique tracking identifier and the reason for the exchange. In various arrangements, each identifier of the subset of identifiers is a predetermined length such that the unique tracking identifier is a fixed length and is associated with the specific asset while on the distributed ledger network. In some arrangements, the distributed ledger network is configured with a plurality of nodes such that each node contains each dataset associated with each asset on the distributed ledger network. In various arrangements, the method further includes retrieving, from the distributed ledger network, the dataset based on providing the unique tracking identifier of the specific asset and determining each update of a plurality of updates of the dataset associated with the unique tracking identifier. In some arrangements, the method further includes receiving a request to report each update of the unique tracking identifier and reporting, by the asset issuer computing device, a timeline of update data of the specific asset based on the unique tracking identifier. In various arrangements, the specific asset is a digital currency based on a unit of fiat currency. In some arrangements, the method further includes generating a cryptographic code associated with the unique tracking identifier.

Some arrangements relate to a system with at least one processing circuits. The one processing circuit can be configured to receive a request to track a specific asset on a distributed ledger network, the request includes a dataset associated with the specific asset. Further, the at least one processing circuit can be configured to determine an asset type associated with the specific asset based on the dataset. Further, the at least one processing circuit can be configured to generate a unique identifier identifying the specific asset. Further, the at least one processing circuit can be configured to generate a unique tracking identifier, the unique tracking identifier including a subset of identifiers, the subset of identifiers including an asset issuer identifier, an asset type identifier, and the unique identifier. Further, the at least one processing circuit can be configured to provide, to the distributed ledger network, the unique tracking identifier, the specific asset, and the dataset associated with the specific asset and receive, from the distributed ledger network, a confirmation notification indicating a successful association of the unique tracking identifier with the specific asset.

In some arrangements, the at least one processing circuit further configured to receive a notification indicating an exchange of the unique tracking identifier off the distributed ledger network and including a reason for the exchange. Further, the at least one processing circuit configured to identify the reason for the exchange, wherein the reason for exchange is based on a set of predefined actions and provide, to the distributed ledger network, the unique tracking identifier and the reason for the exchange. In various arrangements, each identifier of the subset of identifiers is a predetermined length such that the unique tracking identifier is a fixed length and is associated with the specific asset while on the distributed ledger network. In some arrangements, the distributed ledger network is configured with a plurality of nodes such that each node contains each dataset associated with each asset on the distributed ledger network. In various arrangements, the at least one processing circuit further configured to retrieve, from the distributed ledger network, the dataset based on providing the unique tracking identifier of the specific asset and determine each update of a plurality of updates of the dataset associated with the unique tracking identifier. Further, the at least one processing circuit configured to receive a request to report each update of the unique tracking identifier and report a timeline of update data of the specific asset based on the unique tracking identifier. In some arrangements, the at least one processing circuit further configured to generate a cryptographic code associated with the unique tracking identifier.

Some arrangements relate to one or more computer-readable storage media having instructions stored thereon that, when executed by at least one processing circuit, cause the at least one processing circuit to receive a request to track a specific asset on a distributed ledger network, the request includes a dataset associated with the specific asset. Further, the one or more computer-readable storage media having instructions stored thereon that, when executed by at least one processing circuit, cause the at least one processing circuit to determine an asset type associated with the specific asset based on the dataset. Further, the one or more computer-readable storage media having instructions stored thereon that, when executed by at least one processing circuit, cause the at least one processing circuit to generate a unique identifier identifying the specific asset. Further, the one or more computer-readable storage media having instructions stored thereon that, when executed by at least one processing circuit, cause the at least one processing circuit to generate a unique tracking identifier, the unique tracking identifier including a subset of identifiers, the subset of identifiers including an asset issuer identifier, an asset type identifier, and the unique identifier. Further, the one or more computer-readable storage media having instructions stored thereon that, when executed by at least one processing circuit, cause the at least one processing circuit to provide, to the distributed ledger network, the unique tracking identifier, the specific asset, and the dataset associated with the specific asset and receive, from the distributed ledger network, a confirmation notification indicating a successful association of the unique tracking identifier with the specific asset.

In some arrangements, the one or more computer-readable storage media having instructions stored thereon that, when executed by at least one processing circuit, cause the at least one processing circuit to receive a notification indicating an exchange of the unique tracking identifier off the distributed ledger network and including a reason for the exchange. Further, the one or more computer-readable storage media having instructions stored thereon that, when executed by at least one processing circuit, cause the at least one processing circuit to identify the reason for the exchange, wherein the reason for exchange is based on a set of predefined actions and provide, to the distributed ledger network, the unique tracking identifier and the reason for the exchange. In various arrangements, the one or more computer-readable storage media having instructions stored thereon that, when executed by at least one processing circuit, cause the at least one processing circuit to retrieve, from the distributed ledger network, the dataset based on providing the unique tracking identifier of the specific asset. Further, the one or more computer-readable storage media having instructions stored thereon that, when executed by at least one processing circuit, cause the at least one processing circuit to determine each update of a plurality of updates of the dataset associated with the unique tracking identifier. Further, the one or more computer-readable storage media having instructions stored thereon that, when executed by at least one processing circuit, cause the at least one processing circuit to receive a request to report each update of the unique tracking identifier and report a timeline of update data of the specific asset based on the unique tracking identifier.

These and other features, together with the organization and manner of operation thereof, will become apparent from the following detailed description when taken in conjunction with the accompanying drawings.

Figure 1A:
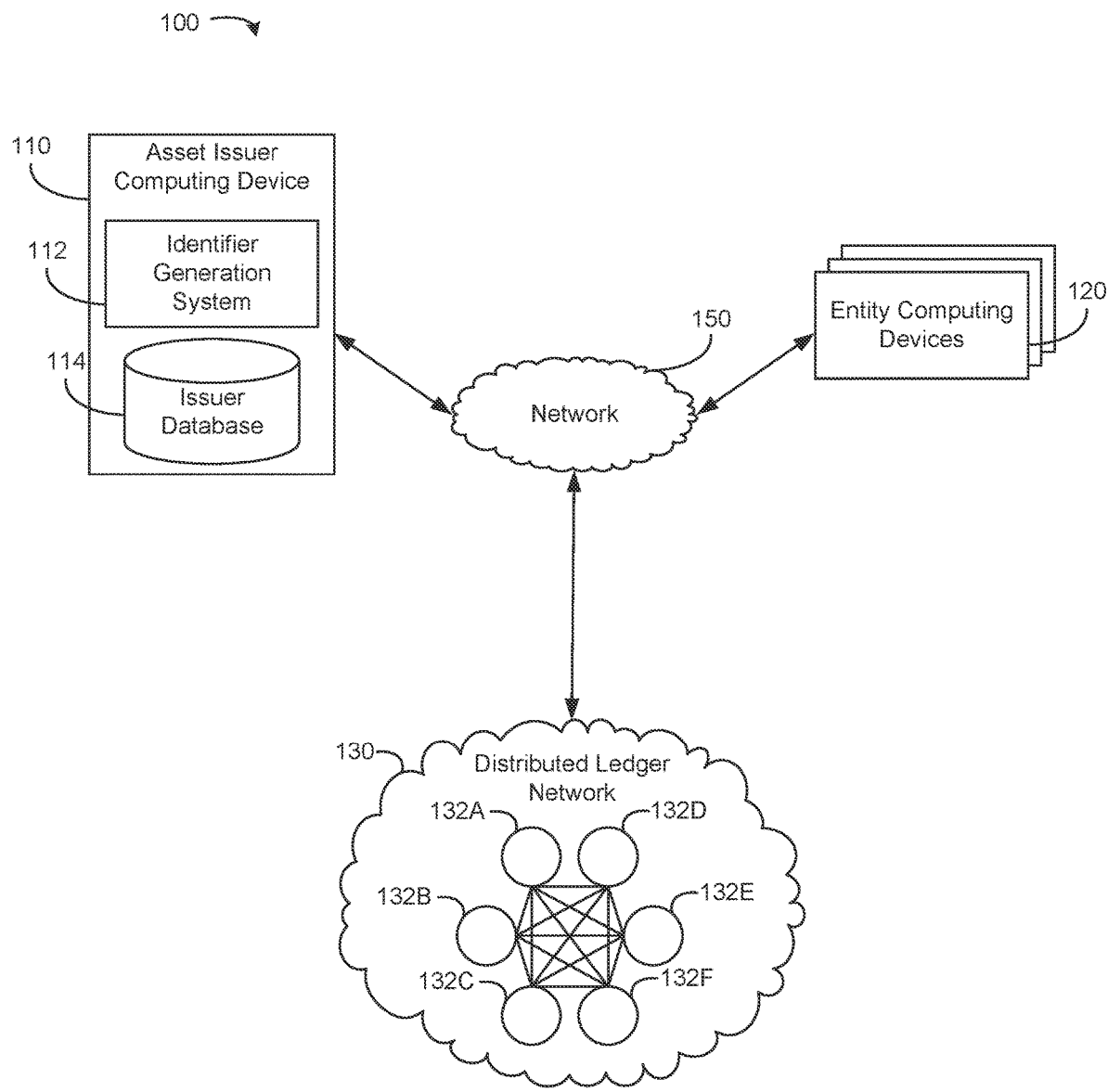
FIG. 1A is a block diagram depicting an example of a system for tracking assets on a distributed ledger network, according to some arrangements.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the FIGS., the systems and methods relate generally to tracking assets on a distributed ledger network. In some embodiments, the causal tracking of assets can include generating a unique tracking identifier that includes a subset of identifiers. In particular, the subset of identifiers can include an asset issuer identifier, an asset type identifier, and a unique identifier such that the unique tracking identifier can be a predetermined length and uniquely identifies each asset on the distributed ledger network.

In many systems, assets (e.g., cryptocurrency) are exchanged on a distributed ledger network such that each exchange includes a destination address. The destination address is unique since each exchange over the distributed ledger network includes a unique, single-use address that is provided to a sender to initiate an exchange. The design of the destination address provides protection and privacy to assets by removing the ability to link exchanges to each other. However, the ability to track an asset within a distributed ledger network, such as associating a unique tracking identifier that can be a predetermined length and can include a subset of identifiers uniquely identifying the asset based on the issuer, type and a unique identifier, provides auditors and clients enhanced visibility into assets on the distributed ledger network. This causal approach allows compliance and reporting systems to provide significant improvements to the end-to-end traceability of assets on distributed ledger networks. Therefore, aspect of the present disclosure address problems in distributed ledger technology (DLT) by providing asset tracking that utilizes a unique tracking identifier such that each exchange, on the distributed ledger network of a specific asset, can be tracked over the lifetime of the specific asset.

Accordingly, the present disclosure is directed to systems and methods for tracking assets on a distributed ledger network such that each exchange of a specific asset can be tracked. In some arrangements, the described systems and methods involve utilizing an asset issuer computing device. The asset issuer computing device allows receiving of a tracking request of a specific asset that includes a dataset. The asset issuer computing device can then determine an asset type and subsequently generate a unique identifier identifying the specific asset such that a unique tracking identifier can be generated utilizing a subset of identifiers including an asset issuer identifier, an asset type identifier, and the unique identifier. In the present disclosure, the unique tracking identifier is associated with the specific asset and is subsequently updated on the distributed ledger network such that specific asset can be tracked in any subsequent exchanges (e.g., execution of smart contracts).

Referring now to FIG. 1A, a block diagram depicting an example of a system 100 for tracking assets on a distributed ledger network 130 is shown, according to some arrangements. The system 100 is shown to include an asset issuer computing device 110, an identifier generation system 112, an issuer database 114, one or more entity computing devices 120, a distributed ledger network 130, a plurality of distributed ledger nodes (e.g., 132A, 132B, 132C, 132D, 132E, 132F), and a network 150. The network 150 may include a local area network (LAN), wide area network (WAN), a telephone network, such as the Public Switched Telephone Network (PSTN), a wireless link, an intranet, the Internet, or combinations thereof. The system 100 can also include at least one data processing system or processing circuit, such as an asset issuer computing device 110. The asset issuer computing device 110 can communicate via the network 150, for example with entity computing devices 120, and/or with distributed ledger nodes on the distributed ledger network 130. Referring to both FIGS. 1 and 2, the one or more processing circuits can include a microprocessor, an application specific integrated circuit (ASIC), a field-programmable gate array (FPGA), and so on, or combinations thereof. A memory can include, but is not limited to, electronic, optical, magnetic, or any other storage or transmission device capable of providing processor with program instructions. Instructions can include code from any suitable computer programming language.

In some arrangements, the asset issuer computing device 110 can be executed on one or more processing circuits, such as those described below in detail with reference to FIG. 7. In addition to the processing circuit, the asset issuer computing device 110 may include one or more databases (e.g., issuer database 114) configured to store data. The asset issuer computing device 110 may also include a generation system (e.g., identifier generation system 112) configured to receive data (e.g., requests) via the network 150 and provide data (e.g., unique tracking identifiers) from the asset issuer computing device 110 to any of the other system and devices on network 150.

The asset issuer computing device 110 may be communicably coupled and operate the distributed ledgers nodes on the distributed ledger network 130. That is, the asset computing device 110 has the role of issuing assets to the distributed ledger network and destroying assets in response to a command. Assets are digital representation of a plurality of different assets. For example, an asset could be a lending and/or trading document/contract, a financial exchange, a fiat currency, a payment card, a payment account, or any of assets associated with services carried out by a financial institution. Further, each asset that is issued by the asset issuer computing device 110 also includes a unique tracking identifier such that the asset can be tracked whenever an exchange of an asset occurs (e.g., a smart contract is executed). In some arrangements, the unique tracking identifier is generated by the identifier generation system 112. That is, the identifier generation system 112 may include one or more processing circuits that when executed can generate a unique tracking identifier associated with a specific asset. The identifier generation system 112 can retrieve data stored in the issuer database 114 that can be utilized to generate the unique tracking identifier. The data stored in the issuer database 114 could include payment account information associated with a plurality of clients of a financial institution, identifying information associated with the plurality of clients of the financial institution, asset information, and a plurality of financial information. Further, the data stored in the issuer database 114 may include personal information (e.g., names, addresses, phone numbers, and so on), authentication information (e.g., username/password combinations, device authentication tokens, security question answers, unique client identifiers, biometric data, geographic data, social media data, and so on), and financial information (e.g., token information, account numbers, account balances, available credit, credit history, exchange histories, and so on) relating to the various users and associated financial accounts. For example, asset information may include a list of asset types, a list of asset issuer identifiers, and any metadata associated with the asset (e.g., creation date, owner, last modified, and so on). In some arrangements the issuer database 114 may include a subset of databases such that the identifier generation system 112 can analyze each database to determine the appropriate information needed to generate the unique tracking identifier.

In various arrangements, assets can be described as tokens or tokenized assets. The asset issuer computing device 110 can also query, via the network 150, one or more distributed ledger nodes 132 for information associated with assets on the distributed ledger network 130. For example, the asset issuer computing device 110 can send commands (e.g., a request to track command, an asset update command, a metadata retrieval command, a unique tracking identifier retrieval command) to the distributed ledger network 130 such that one or more processing circuits (e.g., processing circuit 134 in FIG. 2A) of the one or more distributed ledger nodes can execute the command. Some functionality and characteristics are further explained in detail with reference to FIGS. 2-3. In some examples, the command may receive a response indicating and/or providing data associated with the executed command on the distributed ledger network 130.

The identifier generation system 112 can further include a process for generating a unique tracking identifier (and as shown and explained in detail with reference to FIG. 6). The unique tracking identifier can be a predetermined length (e.g., 16 bytes, 32 bytes, and so on) that can include a subset of identifiers. In various arrangements, the subset of identifiers can include an asset issuer identifier (e.g., ISO 9362 standard, Swift code, and so on), an asset type identifier (e.g., 1 byte, 4 bytes), and a unique identifier (e.g., IEFT RFC4122, Universally Unique identifier (UUID), Uniform Resource Identifier (URI), Cryptographic Hash, and so on). For example, the asset issuer identifier, asset type identifier, and unique identifier could be "WFBIUS6S000," "1852," and "23e4567e89b12d3a456426655440000," respectively. Thus, in this example, the unique tracking identifier could be "WFBIUS6S000-1852-23e4567e89b12d3a456426655440000," and is utilized to identify (e.g., uniquely identifies) a specific asset issued by the asset issuer computing device 110. In another example, the asset issuer identifier, asset type identifier, and unique identifier could be "WFBIUS6S999," "A9C4," "10929DF715C5472B93987158AB89A0A6," respectively. Thus, in this example, the unique tracking identifier could be "WFBIUS6S999-A9C4-10929DF715C5472B93987158AB89A0A6," and is utilized to identify a specific asset issued by the asset issuer computing device 110. The unique tracking identifier can also be a fixed length throughout the lifecycle of the asset. In various arrangements, the unique tracking identifier could be a random length depending on the data associated with the asset. In alternate arrangements, the unique tracking identifier may not be separated by hyphens. For example, with reference to the example above, the unique tracking identifier could be "WFBIUS6S999A9C410929DF715C5472B93987158AB89A0A6."

In some arrangements, the unique tracking identifier could include other optional subsets of identifiers. For example, other subsets of identifiers could include asset creation date, geolocation data of the asset, asset owner. In other examples, the unique tracking identifier could include subset identifiers such as duration, biometric information, geolocation (or location), fraction or percentage to track fractional ownership of an asset (and with reference to FIG. 6). That is, the unique tracking identifier could include a subset identifier that identifies fractional ownership of a specific asset. For example, John Doe may have 50% ownership in the specific asset, and John Candy may have 50% ownership in the specific asset. In this example, the unique tracking identifier could be "HOTELCX-TIMESHARE-KFdf435T$K9MD #5435df-50% JD50% JC." Further, the unique tracking identifier could include a subset identifier that identifies the geolocation of a specific asset. For example, the unique tracking identifier may include latitude data, longitude data, and/or and other type of location or position data to determine the location of the specific asset. In this example, the unique tracking identifier could be "WFBANK-CARL87p0@3fds65B81Vkfdoryq$6892fFDSB SE-15N30W," or "WFBANK-CARL87p0@3fds65B81Vkfdoryq$6892fFD SB SE-15.23456N-30.67890 W." More, the unique tracking identifier could include a subset identifier that identifies biometric data of a specific asset. For example, the unique tracking identifier may include biological (e.g., fingerprint, iris/retina, hand geometry, facial geometry, DNA, etc.) and/or behavioral (e.g., gait, gesture, keystroke dynamics, speech pattern, foot movement pattern, etc.) characteristics that can distinguish one asset from another.

In various arrangements, the format of the unique tracking identifier can vary depending on the asset and/or application. For example and as shown above, the unique tracking identifier can be formatted such that the asset issuer identifier is first, asset type identifier is second, and unique identifier is third in the string. However, in another example, the unique tracking identifier could be formatted such that the unique identifier is first, asset type identifier is second, and asset issuer identifier is third.

One or more entity computing devices 120 may be user to perform various actions and/or access various types of data, some of which may be provide over network 150. An "entity" used herein may refer to a company with one or more individuals operating the entity computing devices 120, and interacting with resources or data via the entity computing devices 120. The entity computing devices 120 may be used to send data (e.g., exchange information) to the asset issuer computing device 110, or may be used to send updated tracking information to the distributed ledger network 130. The entity computing devices 120 can include one or more processors (e.g., any general purpose or special purpose processor), and include and/or be operably coupled to one or more transitory and/or non-transitory storage mediums and/or memory devices (e.g., any computer-readable storage media, such as a magnetic storage, optical storage, flash storage, RAM, and so on).

In various arrangements, entity computing devices 120 can be communicably and operatively coupled (e.g., over network 150) to distributed ledger network 130 and/or asset issuer computing device 110. The entity computing devices 120 can be configured to query the distributed ledger network 130 for information and store information in the distributed ledger network 130. In various arrangements, the distributed ledger network 130 includes various transitory and/or non-transitory storage mediums (e.g., the storage mediums may include but are not limited to magnetic storage, optical storage, flash storage, RAM, and so on). In some arrangements, there may be a plurality of distributed ledger networks that are communicably coupled to each other such that each node on each distributed ledger network can communicate with each other over network 150.

Entity computing devices 120 can be configured to communicate with any device or system shown in system 100 via the network 150. In some arrangements, the entity computing devices 120 can operate as a point-of-sale device such that each entity computing device can include a display, an input device and an application. The display may be used to present account information, exchange information, and the like to a client. The input device may be used to provide input to the entity computing devices 120 and to the asset issuer computing device 110 through the network 150. The input may relate to a financial institution service (e.g., loan request, credit requests, personal information, and so on) used to facilitate exchanges between the asset issuer computing device 110 and the client. The input device may include a keyboard, a mouse, a touchscreen, a biometric sensor (e.g., a fingerprint sensor), a microphone, a camera, a geographic location, and so on. The application may include program logic (e.g., stored executable instructions) configured to implement at least some of the functions described herein. The application may simply be a web browser (e.g., Internet Explorer®, Chrome®, Safari®, and so on) configured to receive and display web pages received from the distributed ledger network 130 and/or asset issuer computing device 110. In other arrangements, the application may include a dedicated application (e.g., a smartphone application), a text message interface, or another program suitable for communicating with the financial institution computing system 106 over the network.

The system 100 can also include a distributed ledger network 130 that can execute smart contracts and store a plurality of unique tracking identifiers associated with specific assets. The distributed ledger network 130 can include a plurality of nodes that are interconnected with one another to form a peer-to-peer network. As shown in FIG. 1A, the distributed ledger network 130 includes nodes 132A, 132B, 132C, 132D, 132E, 132F (collectively referred to herein as "nodes 132") that are interconnected with one another to form the peer-to-peer network. Each of nodes 132 on the distributed ledger network include hardware elements, one or more processors (e.g., any general purpose or special purpose processor), and/or be operably coupled to one or more transitory and/or non-transitory storage mediums and/or memory devices (e.g., any computer-readable storage media, such as a magnetic storage, optical storage, flash storage, RAM, and so on). In some arrangements, each unique tracking identifier could be associated with a specific asset such that the specific asset can be tracked as it exchanged between parties (and as described in detail with reference to FIG. 2A).

Figure 1B:
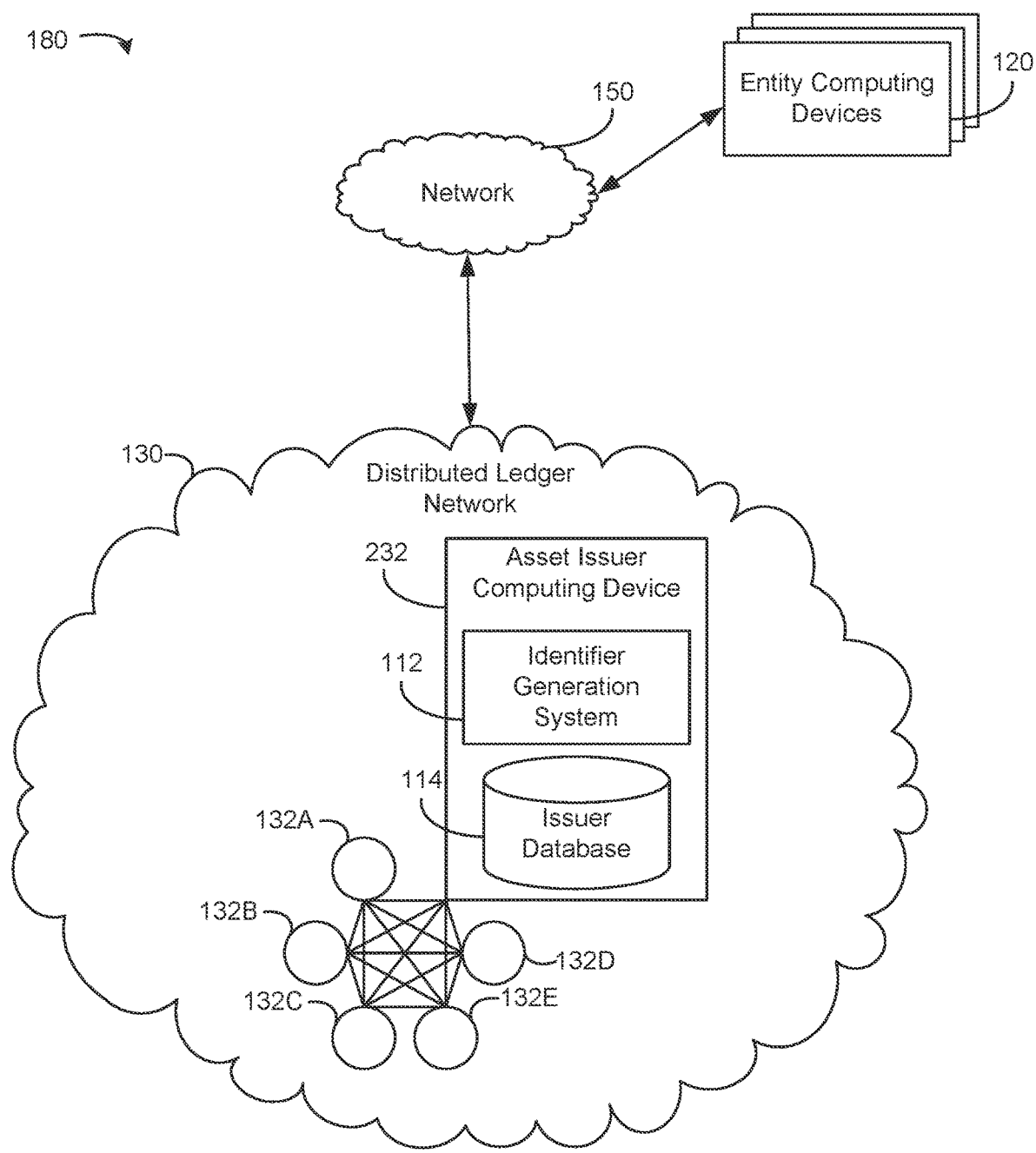
FIG. 1B is a block diagram depicting an example of a system for tracking assets on a distributed ledger network, according to some arrangements.

Referring now to FIG. 1B, a block diagram depicting an example of a system 180 for tracking assets on a distributed ledger network 130 is shown, according to some arrangements. The system 180 includes the identifier generation system 112, the issuer database 114, the one or more entity computing devices 120, the distributed ledger network 130, the plurality of distributed ledger nodes (e.g., 132A, 132B, 132C, 132D, 132E), and a network 150. However, as shown, in some arrangements, the distributed ledger network 130 includes an asset issuer computing device 232 (collectively referred to herein as "asset issuer node 232") that can be interconnected with the distributed ledger nodes (e.g., 132A, 132B, 132C, 132D, 132E) to form a peer-to-peer network (e.g., distributed ledger network 130). Indeed, since the asset issuer node 232 is on the distributed ledger network 130, the asset issuer node 232 can perform operations (e.g., track assets, generate unique identifiers, and so on) on the distributed ledger network 130. For example, instead of communicating over the network 150 for various transaction operations and related computing tasks, the asset issuer node 232 can track assets as it exchanged between parties (e.g., communicating with nodes 132) on the distributed ledger network 130. In some arrangements, the asset issuer node 232 and nodes 132 can be interconnected by any form or medium of digital data communication (e.g., a communication network). Examples of communication networks include a local area network ("LAN") and a wide area network ("WAN"), an inter-network (e.g., the Internet), and peer-to-peer networks (e.g., ad hoc peer-to-peer networks). Additional details relating to the functions of the distributed ledger network 130 and the asset issuer node 232 are provided herein with respect to FIG. 2B.

Figure 2A:
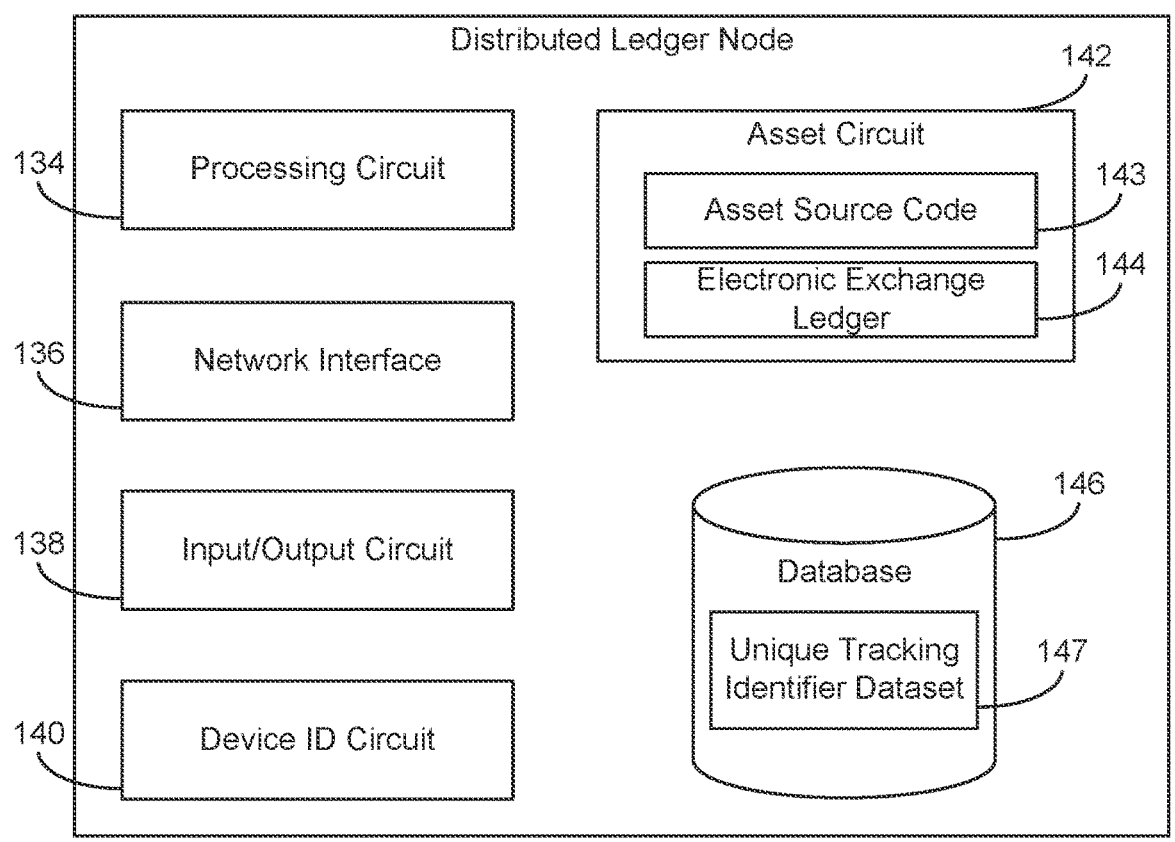
FIG. 2A is a block diagram depicting an example of a distributed ledger node, according to some arrangements.

Referring now to FIG. 2A, a block diagram depicting an example of a distributed ledger node 132 of the distributed ledger network 130 in FIG. 1A is shown, according to some arrangements. That is, any of the nodes (e.g., 132A, 132B, 132C, 132D, 132E, 132F) in FIG. 1A may be a distributed ledger node 132 in FIG. 2A. While various circuits, interfaces, and logic with particular functionality are shown, it should be understood that the distributed ledger node 132 can include any number of circuits, interfaces, and logic for facilitating the functions described herein. For example, the activities of multiple circuits may be combined as a single circuit and implemented on a single processing circuit (e.g., processing circuit 134), as additional circuits with additional functionality are included.

The distributed ledger node 132 can be run or otherwise be executed on one or more processors of a computing device, such as those described below in detail with reference to FIG. 7. In broad view, the distributed ledger node 132 can include a processing circuit 134, a network interface 136, an input/output circuit 138, a device ID circuit 140, an asset circuit 142, asset source code 143, an exchange ledger 144, a database 146, and a unique tracking identifier dataset 147. In some arrangements, the distributed ledger node 132 can include a processing circuit 134 composed of one or more processors and memory.

The distributed ledger node 132 can include a network interface 136 configured to establish a communication session with a computing device for sending and receiving data over the network 150 to the computing device. Accordingly, the network interface 136 includes a cellular transceiver (supporting cellular standards), a global positioning system (GPS) transceiver (supporting GPS standards), a local wireless network transceiver (supporting 802.11X, ZigBee, Bluetooth, Wi-Fi, or the like), a wired network interface, a combination thereof (e.g., both a cellular transceiver, GPS transceiver, a Bluetooth transceiver, and so on), and/or the like. In some arrangements, the distributed ledger node 132 includes a plurality of network interfaces 136 of different types, allowing for connections to a variety of networks, such as local area networks or wide area networks including the Internet, via different sub-networks.

The distributed ledger node 132 can include an input/output circuit 138 configured to receive user input from and provide information to a user of the distributed ledger node 132. In this regard, the input/output circuit 138 is structured to exchange data, communications, instructions, and so on with an input/output component of the distributed ledger node 132. Accordingly, input/output circuit 138 may be any electronic device that conveys data to a user by generating sensory information (e.g., a visualization on a display, one or more sounds, tactile feedback, and so on) and/or converts received sensory information from a user into electronic signals (e.g., a keyboard, a mouse, a pointing device, a touch screen display, a microphone, and so on). One or more user interfaces may be internal to the housing of the distributed ledger node 132, such as a built-in display, touch screen, microphone, and so on, or external to the housing of the distributed ledger node 132, such as a monitor connected to the distributed ledger node 132, a speaker connected to the distributed ledger node 132, and so on, according to various arrangements. In some arrangements, the input/output circuit 138 includes communication circuitry for facilitating the exchange of data, values, messages, and the like between the input/output device and the components of the distributed ledger node 132. In some arrangements, the input/output circuit 138 includes machine-readable media for facilitating the exchange of information between the input/output device and the components of the distributed ledger node 132. In still another arrangement, the input/output circuit 138 includes any combination of hardware components (e.g., a touchscreen, biometric sensory), communication circuitry, and machine-readable media.

The distributed ledger node 132 can include a device identification circuit 140 (shown in FIG. 2A as device ID circuit 140) configured to generate and/or manage a device identifier associated with the distributed ledger node 132. The device identifier may include any type and form of identification used to distinguish the distributed ledger node 132 from other computing devices and/or other distributed ledger nodes. In some arrangements, a device identifier may be associated with one or more other device identifiers. In some arrangements, to preserve privacy, the device identifier may be cryptographically generated, encrypted, or otherwise obfuscated by any circuit of the distributed ledger node 132. In some arrangements, the distributed ledger node 132 may include the device identifier in any communication (any of the commands in FIG. 1A, e.g., a request to track command, an asset update command, a metadata retrieval command, and so on) that the distributed ledger node 132 sends to a computing device.

The distributed ledger node 132 can include an asset circuit 142 composed of asset source code 143 and an electronic exchange ledger 144. The asset source code 143 may be stored in memory of processing circuit 134, which may be accessed by and/or run on processing circuit 134. The electronic exchange ledger 144 may be stored on the same and/or different processor readable memory, which may be accessible by processing circuit 134 when running the asset source code 143. In some arrangements, the electronic exchange ledger 144 on a first node (e.g., node 132A in FIG. 1A) of a distributed ledger network corresponds with the electronic exchange ledger of one or more nodes within the distributed ledger network, to the extent that the nodes have synchronized/updated their electronic exchange ledgers (e.g., received the latest exchanges via a download or during a reconciliation process). Accordingly, the electronic exchange ledger 144 may be a public ledger.

In some arrangements, exchanges on a distributed ledger network include utilizing smart contracts (e.g., virtual contracts/agreements) As used herein, the phrase "smart contract" generally refers to a self-executing code (e.g., in a distributed ledger network or other system) that executes when a set of conditions that have been agreed upon by the parties of the smart contract are met. Although the figures and specification generally discuss utilizing smart contracts on assets, the systems, methods, and apparatuses disclosed herein can also be used for a plurality of and types of agreements, such as but not limited to deeds, leases, wills, non-smart contracts, traditional legal contracts, and other types of agreements between multiple parties. That is, parties to the smart contract or other types of agreements may be individuals, companies, organizations, and so on.

The distributed ledger node 132 can include at least one database 146. The database 146 can include data structures (e.g., datasets) for storing information such as the metadata about assets (e.g., smart contract execution history), unique tracking identifiers, distributed ledger node information, or additional information. Further, the data stored in the database 146 may include personal information (e.g., names, addresses, phone numbers, and so on), authentication information (e.g., username/password combinations, device authentication tokens, security question answers, unique client identifiers, biometric data, geographic data, social media data, and so on), and financial information (e.g., token information, account numbers, account balances, available credit, credit history, exchange histories, and so on) relating to the various assets. The database 146 can be part of the distributed ledger node 132, or a separate component that the distributed ledger node 132, asset issuer computing device 110, and/or entity computing devices 120 can access via the network 150. The database 146 can also be distributed throughout distributed ledger network 130 and/or system 100. For example, the database 146 can include multiple databases associated with the distributed ledger nodes on the distributed ledger network 130, asset issuer computing device 110, entity computing devices 120, or all three. In some arrangements, each node on the distributed ledger network 130 (e.g., 132A, 132B, 132C, 132D, 132E, and 132F) includes a database such that each database contains the same data (e.g., electric exchange ledger, unique tracking identifiers, and metadata about those unique tracking identifiers). In some arrangements, each data structure can be combined into one dataset.

The database 146 can include a data structure (e.g., dataset) associated with a unique tracking identifier dataset 147. The unique tracking identifier dataset 147 can include the unique tracking identifiers associated with specific assets. That is, the unique tracking identifier dataset 147 includes key value pairs, where the key is the specific asset and the value is a unique tracking identifier associated with the specific asset. For example, the key could be a loan and the value could be a unique tracking identifier that includes a subset of identifiers. In this example, the subset of identifiers could be a identifier (e.g., ISO 9362 standard) that uniquely identifies the issuer (e.g., bank or credit union) that issued the loan (e.g., asset issuer), a identifier (e.g., 1852) associated with the type of loan (e.g., asset type, e.g., title loan, payday loan, home equity loan, unsecured personal loan, and so on), and also a identifier (e.g., UUID-IETF RFC4122 Compliant) associated with a unique identifier. That is, in the above example, the unique tracking identifier associated with the loan is structured such that the unique tracking identifier can identify metadata associated with the asset as well as uniquely identify the asset throughout the lifecycle of the loan (e.g., Origination, Underwriting, Closing, Servicing, and so on).

In another example, the key could be a traveler's check and the value is a unique tracking identifier that includes a subset of identifiers. In this example, the subset of identifiers could be a identifier (e.g., 1111) that uniquely identifies the issuer that issued the traveler's check, a identifier (e.g., 2552) associated with the type of traveler's check (e.g., particular denomination—$50, $100, $250), and also a identifier associated with a unique identifier. That is, in the above example, the unique tracking identifier associated with the traveler's check is structured such that the unique tracking identifier can identify metadata associated with the asset as well as uniquely identify the asset throughout the lifecycle of the traveler's check (e.g., Issued, Redeemed, Voided, and so on).

In yet example, the key could be a prepaid debit card and the value is a unique tracking identifier that includes a subset of identifiers. In this example, the subset of identifiers could be a identifier (e.g., 5555) that uniquely identifies the issuer (e.g., Walgreens, Walmart, Amazon) that issued the prepaid debit card, a identifier (e.g., 1954) associated with the type of prepaid debit card (e.g., Visa, MasterCard, American Express, Discover), and also a identifier associated with a unique identifier. That is, in the above example, the unique tracking identifier associated with the prepaid debit card is structured such that the unique tracking identifier can identify metadata associated with the asset as well as uniquely identify the asset throughout the lifecycle of the prepaid debit card (e.g., Issued, Funded, Redeemed, Voided, and so on).

In some arrangements, the unique tracking identifier can also be associated with a plurality of metadata. That is, the unique tracking identifier can have a key value pair as well as metadata associated with the specific unique tracking identifier in the unique tracking identifier dataset 147. In some arrangements, metadata could include each smart contract that has been executed associated with that unique tracking identifier. In various arrangements, metadata could include any data that describes characteristics or aspects of the specific asset. For example, a characteristics could include geographic locations of the specific asset over the lifecycle of the specific asset. In another example, a characteristics could include security information (e.g., PIN, biometric information, account number, credit card number, security code, and so on) associated with the specific asset. In some arrangements, a unique tracking identifier and/or any metadata associated with the unique tracking identifier may be associated with one or more other unique tracking identifiers (e.g., a plurality of pre-paid debit cards provided to the same client). In some arrangements, to preserve privacy, the unique tracking identifier and/or any metadata associated with the unique tracking identifier may be cryptographically generated, encrypted, or otherwise obfuscated by any circuit of the distributed ledger node 132.

In some arrangements, a distributed ledger node 132 of a distributed ledger network (e.g., distributed ledger network 130 in FIG. 1A) may be configured to send and/or receive, via the network 150, data associated with the electronic exchange ledger 144 to an asset issuer computing device 110 and/or one or more entity computing devices 120. In various arrangements, a distributed ledger node 132 of a distributed ledger network (e.g., distributed ledger network 130 in FIG. 1A) may be configured to send and/or receive, via the network 150, data associated with the database 146 to an asset issuer computing device 110 and/or one or more entity computing devices 120. In some arrangements, after a successful completion and/or failure of an execution of a command/commands, the processing circuit 134/network interface 136 may provide a confirmation/failure notification to one or more systems described herein (e.g., system 100 in FIG. 1A)

In some arrangements, the distributed ledger node 132 may be configured to receive (via the network interface 136) a request to track command from the asset issuer computing device 110 and/or entity computing devices 120. The request to track command can designate a specific asset that includes a new unique tracking identifier associated with the specific asset. That is, the request to track a specific asset can cause the distributed ledger node 132 to update the unique tracking identifier dataset 147 with the new unique tracking identifier associated with the specific asset. In some arrangements, the updated unique tracking identifier dataset 147 is replicated across each distributed ledger node such that whenever one distributed ledger node gets updated (e.g., with the new unique tracking identifier) every other node also gets updated. Further, in response to a request to track command, the specific asset may be added to the electronic exchange ledger 144 such that any subsequent exchanges of the specific asset can be exchange on the electronic exchange ledger 144 and tracked utilizing the provided new unique tracking identifier. Additional details associated with the request to track command is described in detail with reference to method 300 in FIG. 3.

In some arrangements, the distributed ledger node 132 may be configured to receive (via the network interface 136) an asset update command from another distributed ledger node and/or the asset issuer computing device 110 and/or entity computing devices 120. The asset update command can designate a unique tracking identifier associated with the unique tracking identifier dataset 147. In some arrangements, the asset update command can also include data. That is, to maintain the accuracy of the electronic exchange ledger 144 and the unique tracking identifier dataset 147, the processing circuit 134 can update electronic ledger information and asset information associated with a particular unique tracking identifier based on receiving a unique tracking identifier along with the data to be updated. Further, if an asset was exchanged off the distributed ledger network 130 (e.g., off-ledger exchange), the asset update command could include data associated with the off-ledger exchange. For example, if a title for car is exchanged based on a purchase of a car (e.g., off-ledger exchange) an asset update command may be sent by a computing device (e.g., entity computing devices 120 in FIG. 1A) that designates an exchange occurred along with any information associated with the exchange. Further, in this example, the distributed ledger node 132 can subsequently update the electronic exchange ledger 144 including the new exchange along with add additional data to the dataset (in the unique tracking identifier dataset 147) of the unique tracking identifier. Additional details associated with the asset update command is described in detail with reference to method 400 in FIG. 4.

In some arrangements, the distributed ledger node 132 may be configured to receive (via the network interface 136) a metadata retrieval command from the asset issuer computing device 110 and/or entity computing devices 120. The metadata retrieval command can designate a unique tracking identifier associated with unique tracking identifier dataset 147. That is, the metadata stored in the unique tracking identifier dataset 147 can be provided to a computing device of the requester (e.g., asset issuer computing device 110) based on analyzing the one or more databases (e.g., database 146) and analyzing the electronic exchange ledger 144. Additional details associated with the asset update command is described in detail with reference to method 500 in FIG. 5.

In some arrangements, the command may include a smart contract, that when executed by the distributed ledger node 132, causes the distributed ledger node 132 of the distributed ledger network 130 to monitor/detect the exchanges that are made by the distributed ledger node 132. The distributed ledger node 132 may store the smart contract in database 146. When an exchange request is sent or received by the distributed ledger node 132 on the distributed ledger network 130, the smart contract may execute and as a result update the electric exchange ledger 144 and subsequently the unique tracking identifier dataset 147. In various arrangements, each command can include program code (e.g., a script, an executable, and so on) that, when executed by a distributed ledger node (e.g., 132A) of the distributed ledger network 130, causes the node to execute a specific set of instructions.

In various arrangements, the command may cause the distributed ledger node 132 to send the command (or copies thereof) to other nodes in the distributed ledger network 130, thereby causing those nodes to also perform the command. The distributed ledger node 132 can include a bus (not shown, discussed in detail with reference to FIG. 7), such as an address/data bus or other communication mechanism for communicating information, which interconnects circuits and/or subsystems (e.g., asset circuit 142) of the distributed ledger node 132. In some arrangements, the distributed ledger node 132 may include one or more of any such circuits and/or subsystems.

In some arrangements, some or all of the circuits of the distributed ledger node 132 may be implemented with the processing circuit 134. For example, any of the distributed ledger node 132 may be implemented as a software application stored within the memory and executed by the processor of processing circuit 134. Accordingly, such arrangement can be implemented with minimal or no additional hardware costs. In some arrangements, any of these above-recited circuits rely on dedicated hardware specifically configured for performing operations of the circuit. In some arrangements, each node is associated with an entity computing device (e.g., entity computing devices 120 in FIG. 1A). That is, each entity computing device may run a dedicated distributed ledger node. In this arrangement, the dedicated distributed ledger node could utilize resources of the entity computing device or vice versa.

As shown, the arrangements described herein improve current DLT that would otherwise need, if even possible, significant computing time, processing power, and network bandwidth to determine a timeline of an asset on a distributed ledger network. That is, due to the nature of distributed ledger network and the architecture around protection and privacy to assets, utilizing a unique tracking identifier significantly reduces, computing time, processing power, and network bandwidth, enabling computing devices (e.g., distributed ledger nodes) to execute other instruction that could not been executed previously.

Figure 2B:
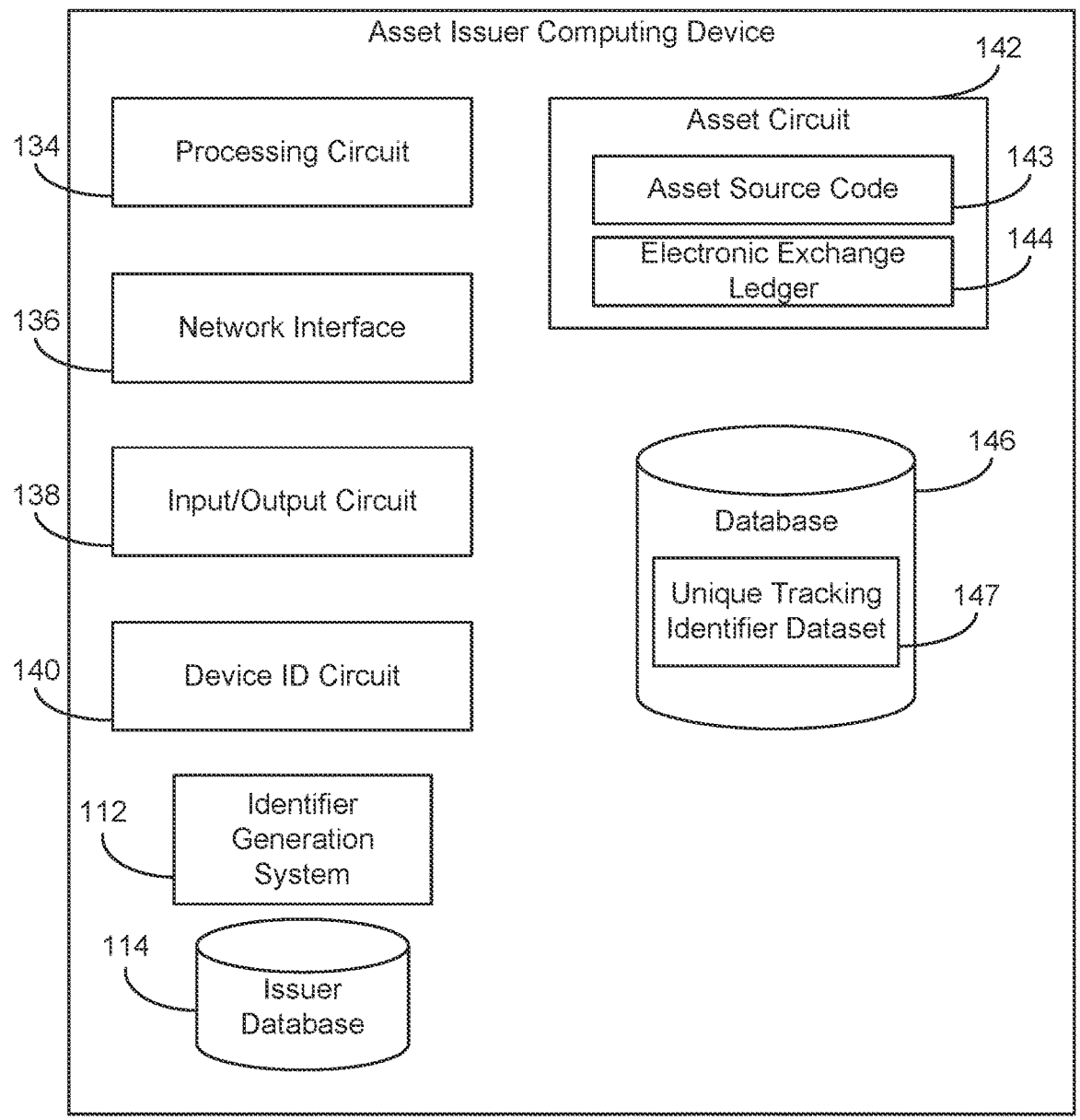
FIG. 2B is a block diagram depicting an example of a distributed ledger node, according to some arrangements.

Referring now to FIG. 2B, a block diagram depicting an example of an asset issuer computing device node 232 of the distributed ledger network 130 in FIG. 1B is shown, according to some arrangements. The asset issuer computing device node 232 is shown to include the identifier generation system 112, the issuer database 114 as described with respect to FIG. 1A. Further, the asset issuer computing device node 232 is shown to include the processing circuit 134, the network interface 136, the input/output circuit 138, the device ID circuit 140, the asset circuit 142, the asset source code 143, the electronic exchange ledger 144, the database 146, and the unique tracking identifier dataset 147 as described with respect to FIG. 2A. However, as shown, in some arrangements, the distributed ledger network 130 includes an asset issuer computing device node 232 (collectively referred to herein as "asset issuer node 232") that can be interconnected with the nodes (e.g., 132A, 132B, 132C, and so on) to form a peer-to-peer network (e.g., distributed ledger network 130). Indeed, since the asset issuer node 232 is on the distributed ledger network 130, the asset issuer node 232 can perform various operations (e.g., asset tracking) on the distributed ledger network 130. For example, instead of communicating over the network 150 for various asset operation and related computing tasks, the asset issuer 232 can update assets, retrieve metadata, execute smart contracts, and/or various asset operations (e.g., communicating with nodes 132) on the distributed ledger network 130. That is, any of the nodes (e.g., 132A, 132B, 132C, 132D, 132E, 132F) in FIG. 1A and/or any of the nodes in FIG. 1B may be an asset issuer node 232. While various circuits, interfaces, and logic with particular functionality are shown, it should be understood that the asset issuer node 232 can include any number of circuits, interfaces, and logic for facilitating the functions described herein. For example, the activities of multiple circuits may be combined as a single circuit and implemented on a single processing circuit (e.g., processing circuit 134), as additional circuits with additional functionality are included. In some arrangements, the asset issuer node 232 can execute similar instructions to those of distributed ledger node 132 in FIG. 2A.

Figure 3:
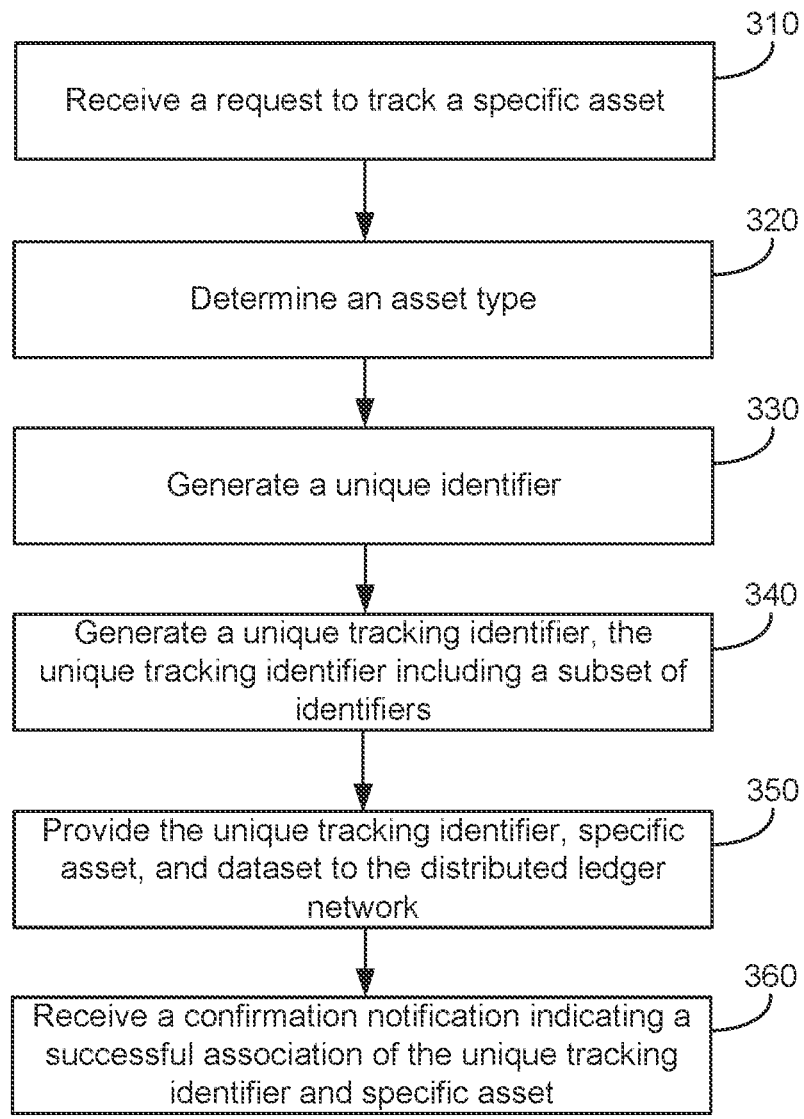
FIG. 3 is a flowchart for a method of tracking assets on the distributed ledger network, according to some arrangements.

Referring now to FIG. 3, a flowchart for a method 300 of tracking assets on the distributed ledger network is shown, according to some arrangements. System 100 can be configured to perform method 300. Further, any computing device described herein can be configured to perform method 300.

In broad overview of method 300, at block 310, the asset issuer computing device receives a request to track a specific asset. At block 320, the asset issuer computing device determines an asset type. At block 330, the asset issuer computing device generates a unique identifier. At block 340, the asset issuer computing device generates a unique tracking identifier where the unique tracking identifier includes a subset of identifiers. At block 350, the asset issuer computing device provides the unique tracking identifier with the specific asset to the distributed ledger network. At block 360, the asset issuer computing device receives a confirmation notification indicating a successful association of the unique tracking identifier with the specific asset.

Referring to method 300 in more detail, at block 310, the asset issuer computing device receives a request to track a specific asset on the distributed ledger network, the request includes a dataset associated with the specific asset. For example, the request could be from an entity computing device (e.g., entity computing devices 120 in FIG. 1A) associated with an employee (e.g., requester) at a financial institution. In another example, the request could be from a client computing device associated with a client of a financial institution. An "identifier" used herein may refer to any numerical digits, characters, punctuation, whitespace or symbol. In some arrangements, the requester may be needed to input additional information about the specific asset. For example, the specific asset could be a mortgage agreement associated with a loan for a house, and the additional information could include the amount of the loan, the mortgage agreement signer, the date of signage, the employee administering the mortgage agreement. In another example, the specific asset could be a pre-paid debit card, and the additional information could include the amount of the pre-paid debit card, a security pin inputted from the client, and a biometric indicator inputted from the client.

At block 320, the asset issuer computing device determines an asset type associated with the specific asset based on the dataset. In some arrangements, the asset issuer computing device analyzing one or more databases associated with a plurality of assets. In various arrangements, the asset type uniquely identifies each asset of a plurality of assets. For example, there could be a sorted list of all the asset types such that each asset has a unique identifier (e.g., numbers and/or characters, e.g., "5CB7", "1952CGH") associated with the asset type. However, in some instances, if the asset type is not associated with the sorted list, the asset issuer computing device may add the asset type to the list and assign it a new unique identifier. In some arrangements, the asset type may not be needed, and instead the asset issuer computing device could utilize a default string (e.g., "XXXX", "00000000") indicating the asset type is not essential. In various arrangements, the asset type identifier is a pre-determined length such that each asset has a unique identifier that is the same length (e.g., 2 bytes, 4 bytes).

At block 330, the asset issuer computing device generates a unique identifier identifying the specific asset. That is, the asset issuer computing device may utilize an internal tool and/or external third-party tool to generate a unique identifier (e.g., ULM, URI, Cryptographic Hash, and so on) associated with specific asset. In one example, the asset issuer computing device may execute a software application that produces a unique identifier. In another example, the asset issuer computing device may send a request to a third-party to provide a unique identifier, which can be subsequently received after generation. In various arrangements, the unique identifier is a pre-determined length such that each unique identifier is the same length (e.g., 32 bytes, 64 bytes).

At block 340, the asset issuer computing device generates a unique tracking identifier, the unique tracking identifier including a subset of identifiers, the subset of identifiers including an asset issuer identifier, an asset type identifier, and the unique identifier. That is, in response to determining an asset type and generating a unique identifier, the asset issuer computing device can utilize that information and other information to generate a unique tracking identifier associated with a specific asset (also described in detail with reference the identifier generation system 112 of FIG. 1A, and shown with reference to FIG. 6).

In some arrangements, the subset of identifiers includes an asset issuer identifier (e.g., SWIFT code, Business Identifier Code) that is associated with the asset issuer computing device (e.g., asset issuer computing device 110 in FIG. 1A). For example, the asset issuer identifier may be 11 characters in length (e.g., "ENTTUSWIEOC") and include an entity identifier (e.g., ENTT) identifying the entity, an International Organization for Standardization (ISO) country code (e.g., US), a location code (e.g., WI) identifying the location of the issuer, and an entity office code (e.g., EOC) identifying the particular office location of the entity. In various arrangements, the asset issuer identifier can unique identify the asset issuer such that no asset issuer identifier is the same.

In some arrangements, the subset of identifiers also includes an asset type identifier. That is, the asset type identifier is associated with the determination in block 320. In various arrangements, the subset of identifiers also include a unique identifier. That is, the unique identifier is associated with the generation in block 330.

The unique tracking identifier can combine the subset of identifiers utilizing a plurality of combinations. That is, the unique tracking identifier can be a pre-determined length and include the subset of identifiers in a variety of combinations. For example, the asset type may at the front of the unique tracking identifier (e.g., "ASSET TYPE_"), the asset issuer identifier may be in the middle of unique tracking identifier (e.g., "_ASSET ISSUER_"), and the unique identifier may be at the end of the unique tracking identifier (e.g., "_UNIQUE IDENTIFER). However, the combination explained above is not needed and thus, any combination of the asset type identifier, asset issuer identifier, and unique identifier may be acceptable (e.g., ASSET ISSUER-ASSET TYPE-UNIQUE IDENTIFIER). In some arrangements, the unique tracking identifier can have additional subsets of identifiers associated with the specific asset.

At blocks 350 and 360, the asset issuer computing device provides, to the distributed ledger network, the unique tracking identifier, the specific asset, and the dataset associated with the specific and receives, from the distributed ledger network, a confirmation notification indicating a successful association of the unique tracking identifier with the specific asset. That is, the unique tracking identifier is associated with the specific asset on the distributed ledger network such that any future exchanges (e.g., execution of smart contracts) of the specific asset occur on the distributed ledger network. Further, the specific asset could be tracked utilizing the unique tracking identifier such that data associated with any modification to the specific asset can be reviewed and audited. Thus, the arrangements described herein improve the hardware functionality of distributed ledger networks by incorporating unique tracking identifiers in every asset on the distributed ledger network. Further, the systems and methods described herein providing significantly improvements to DLT and auditing system since significantly less computing time, processing power, and network bandwidth is needed to track an asset on a distributed ledger network.

In some arrangements, method 300 can also include the asset issuer computing device receiving a notification indicating an exchange of the unique tracking identifier off the distributed ledger network and including a reason for the exchange. For example, an asset was sold between two parties at a physical location (e.g., Milwaukee, WI, Dallas, TX, Los Angeles, CA, and so on) that did not include utilizing any node on the distributed ledger network. Subsequently, the asset issuer computing device can identify the reason for the exchange based on a set of predefined actions and provide, to the distributed ledger network, the unique tracking identifier and the reason for the exchange. That is, the asset issuer computing device can provide all the information associated with the exchange off-ledger such that the nodes on the distributed ledger network can record the exchange on the exchange ledger along with update the database with the new information associated with the particular unique tracking identifier. In some arrangements, the set of predefined actions can be actions defined by a computing device (e.g., asset issuer computing device 110 in FIG. 1A) and/or a processing circuits of the distributed ledger network 130. Further, the set of predefined actions could be a sorted list of actions associated with a specific asset and/or asset type. That is, the predefined actions could include any exchange that is typically recorded on the distributed ledger network (e.g., a transaction, a sale, a trade, a transfer of ownership, a foreclosure, an impound, a purchase, a legal action, a civil action, a location change, and so on).

In various arrangements, method 300 can also include the asset issuer computing device retrieving, from the distributed ledger network, the dataset based on providing the unique tracking identifier of the specific asset and determining each update of a plurality of updates of the dataset associated with the unique tracking identifier. For example, the asset issuer computing device can determine everyone that has interacted with the asset, every time the asset has "changed hands" (e.g., new owner), and every time the asset has executed a smart contract. In some arrangements, any information stored in the electronic exchange ledger and/or database of any distributed ledger nodes on the distributed ledger network can be retrieved and analyzed.

In some arrangements, method 300 can also include the asset issuer computing device receiving a request to report each update of the unique tracking identifier. For example, an owner of a house that has a loan through a financial institution may want to know what dates the last past 12 payments on the loan include. Subsequently, the asset issuer computing device can generate a report of a timeline of update data and report (e.g., to a client computing device) a timeline of update data of the specific asset based on the unique tracking identifier. In some arrangements, the asset issuer computing device can also generate a cryptographic code associated with the unique tracking identifier.

Figure 4:
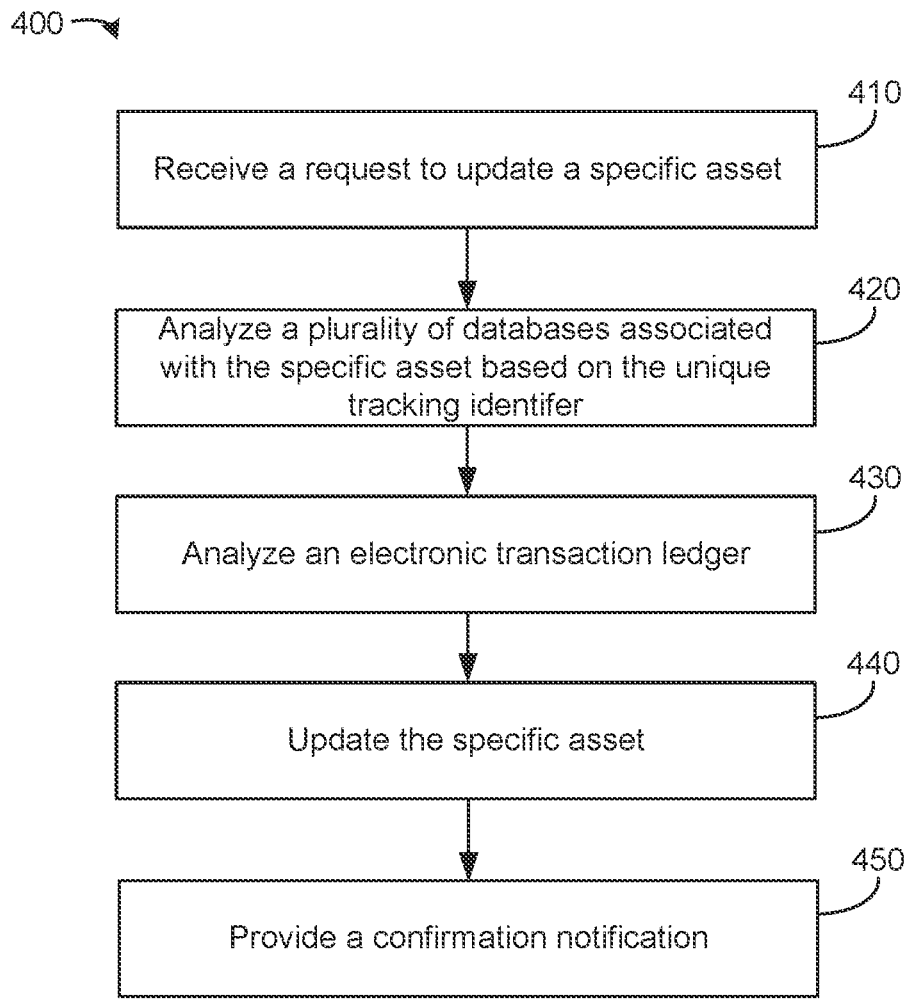
FIG. 4 is a flowchart for a method of tracking assets on the distributed ledger network, according to some arrangements.

Referring now to FIG. 4, a flowchart for a method 400 of tracking assets on the distributed ledger network is shown, according to some arrangements. System 100 can be configured to perform method 400. Further, any computing device described herein can be configured to perform method 400. The method 400 resembles similar features and functionality, described above in detail with reference to FIG. 3.

In broad overview of method 400, at block 410, the one or more processing circuits receive a request to update a specific asset. At block 420, the one or more processing circuits analyze a plurality of databases associated with the specific asset based on the unique tracking identifier. At block 430, the one or more processing circuits analyze an electronic exchange ledger. At block 440, the one or more processing circuits update the specific asset. At block 450, the one or more processing circuits provide a confirmation notification.

Referring to method 400 in more detail, at block 410, the one or more processing circuits of a distributed ledger network (e.g., distributed ledger network 130 in FIG. 1A) may receive a request to update a specific asset based on a unique tracking identifier. For example, the request to update may be associated with an off-ledger exchange. In another example, the request to update may be associated with new data (e.g., different location, changed security information, and so on) associated with the specific asset.

At block 420, the one or more processing circuits of the distributed ledger network may analyze a plurality of databases associated with the specific asset based on the unique tracking identifier. That is, each node on the distributed ledger network may contain a copy of a plurality of databases associated with a plurality of assets. In some arrangements, analyzing may include using a machine learning algorithm (e.g., a neural network, convolutional neural network, recurrent neural network, linear regression model, sparse vector machine, and so on). The one or more processing circuits can input one or more datasets and/or unique tracking identifier into the machine learning model, and receive an output from the model indicating all the data associated with the unique tracking identifier in the database.

At block 430, the one or more processing circuits of the distributed ledger network may analyze an electronic exchange ledger associated with the specific asset based on the unique tracking identifier. That is, each node on the distributed ledger network may contain a copy of a plurality of the electronic exchange ledger associated with a plurality of assets. In some arrangements, the analyzing may include using a machine learning algorithm (e.g., a neural network, convolutional neural network, recurrent neural network, linear regression model, sparse vector machine, and so on). The one or more processing circuits can input one or more datasets and/or unique tracking identifier into the machine learning model, and receive an output from the model indicating all the data associated with the unique tracking identifier on the electronic exchange ledger.

At blocks 440 and 450, the one or more processing circuits of the distributed ledger network may update the specific asset based on data analyzed from the plurality of databases and the electronic transaction ledger. Further, to reduce duplication, data that has already been determined to be on the distributed ledger network may not be added. More, to verify data associated with the unique tracking identifier is consistent on each node and exchange ledger, data associated with the unique tracking identifier may be updated across each node on the distributed ledger network. In response to updating the data associated with the unique tracking identifier, a confirmation notification may be sent to one or more computing devices confirming the update associated with the request to update the specific asset. In some arrangements, the notification may include information associated with which data was added to the distributed ledger network. In some arrangements, the update request may not be performed and thus a notification could be sent indicating no update was performed.

Figure 5:
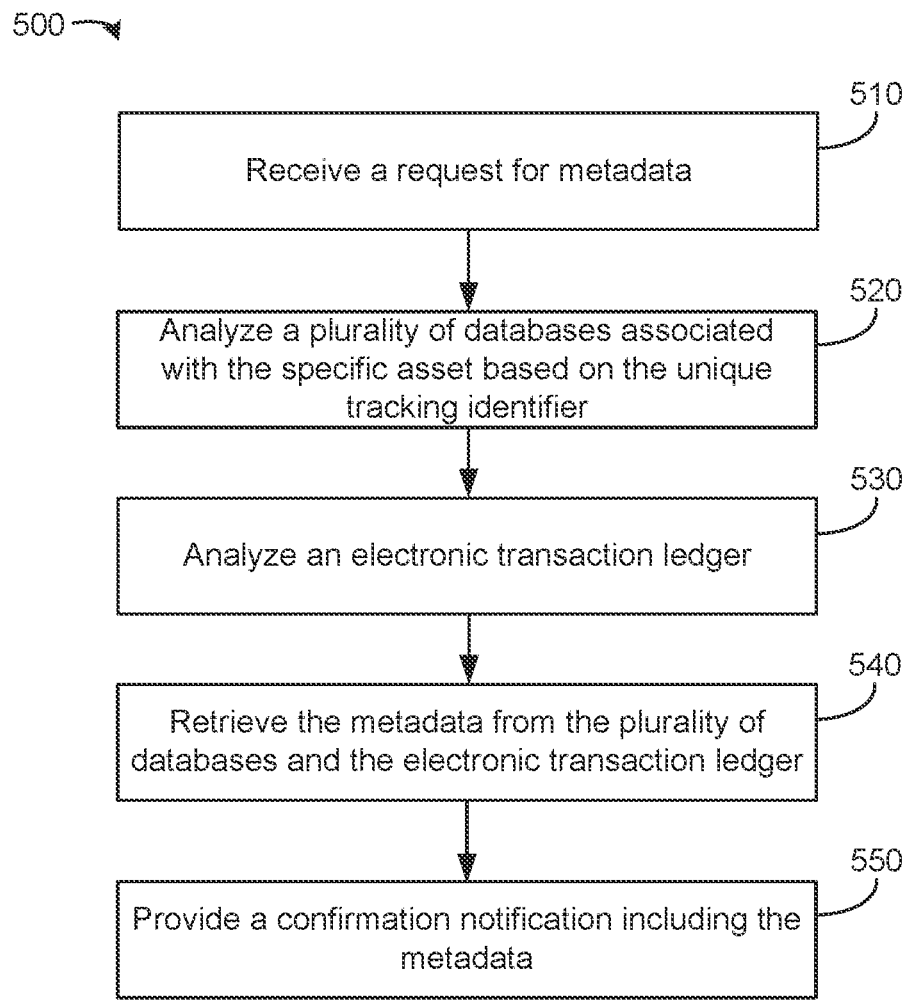
FIG. 5 is a flowchart for a method of tracking assets on the distributed ledger network, according to some arrangements.

Referring now to FIG. 5, a flowchart for a method 500 of tracking assets on the distributed ledger network is shown, according to some arrangements. System 100 can be configured to perform method 500. Further, any computing device described herein can be configured to perform method 500. The method 500 resembles similar features and functionality, described above in detail with reference to FIGS. 3-4.

In broad overview of method 500, at block 510, the one or more processing circuits receive a request to for metadata. At block 520, the one or more processing circuits analyze a plurality of databases associated with the specific asset based on the unique tracking identifier. At block 530, the one or more processing circuits analyze an electronic exchange ledger. At block 540, the one or more processing circuits retrieve the metadata from the plurality of databases and the electronic exchange ledger. At block 450, the one or more processing circuits provide a confirmation notification including the metadata.

Referring to method 500 in more detail, at block 510, the one or more processing circuits of a distributed ledger network (e.g., distributed ledger network 130 in FIG. 1A) may receive a request to for metadata based on a unique tracking identifier. For example, the request for metadata may be associated with each smart contract executed and the data associated with each executed smart contract. In another example, the request for metadata may be associated with the current owner of an asset, and/or status of the asset (e.g., late on payments, up-to-date on payments, and so on).

Blocks 520-530 are described in detail with reference to FIG. 4, blocks 420-430. However, at blocks 540 and 550, the one or more processing circuits of the distributed ledger network may retrieve the identified data (e.g., metadata) associated with unique tracking identifier and determined based on analyzing the plurality of databases and the electronic transaction ledger. In response to retrieving the data associated with the unique tracking identifier, a confirmation notification may be sent to one or more computing devices confirming the retrieval of the data associated with the request for metadata, along with including the retrieved metadata. In some arrangements, the data request may not be found/exists and thus a notification could be sent indicating no data was found/exists.

Figure 6:
FIG. 6 is an example illustration of a unique tracking identifier, according to some arrangements.

Referring now to FIG. 6, an example illustration a unique tracking identifier 600 is shown, according to some arrangements. As shown, in some arrangements, the unique tracking identifier can include an asset issuer identifier, an asset type identifier, and a unique identifier. In various arrangements, the unique tracking identifier may also include a subset identifier. In some arrangements, the unique tracking identifier may separate identifier by hyphens. Some other examples are shown in the table below (Table 1):

| Asset Issuer Identifier | Asset Type Identifier | Unique Identifier | Subset Identifier |
|---|---|---|---|
| WFC | Digital Cash | dad10c068bcb48baad6d6d673149d62f | |
| WFC | Conventional Loan | 10929DF815C5472B93987158AB89A0A6 | @ 37.7540856,-122.4345778,17 |
| HOTELX | Timeshare | f8bfbe98cbf3479ab6f01df31192fb7b | Week52 |
| Apartments4Units | ClassA | 8952f8d95c2b48208458b839032f4286 | 20% |
| HouseLend | InterestRate | 585dfs365fesdf251dfs2cx36fde34533g | Expires5weeks |
| PROVInst | TapPay | Vcxvdfy&64r#*fdv4558dfe58GDF2 | |
| CARRent | FordRaptor | 562n5k8569dr6598123647565hjbg5586dc3c | Jan. 1, 2020 |
| EPICSys | HealthInfo | fdebgfgbnghHGfcSDSd&^3fdsvvhyt56 | Biometric: 0100100 0101101010101010 1001011111000110 11001001 |

Figure 7:
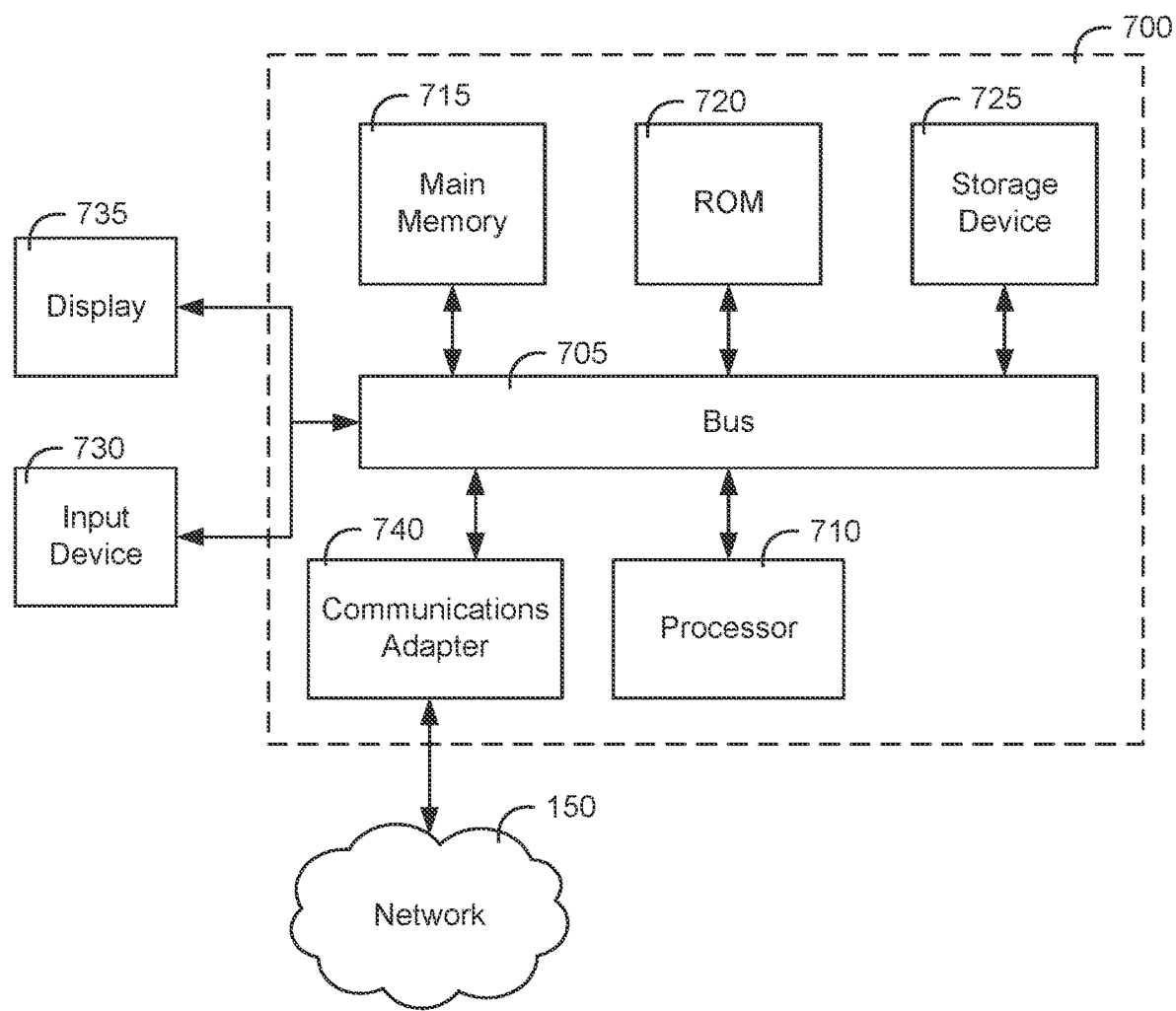
FIG. 7 is a block diagram illustrating an example computing system suitable for use in the various arrangements described herein.

FIG. 7 illustrates a depiction of a computer system 700 that can be used, for example, to implement an example asset issuer computing device 110, an example entity computing device 120, an example distributed ledger network 130, and/or various other example systems described in the present disclosure. The computing system 700 includes a bus 705 or other communication component for communicating information and a processor 710 coupled to the bus 705 for processing information. The computing system 700 also includes main memory 715, such as a random access memory (RAM) or other dynamic storage device, coupled to the bus 705 for storing information, and instructions to be executed by the processor 710. Main memory 715 can also be used for storing position information, temporary variables, or other intermediate information during execution of instructions by the processor 710. The computing system 700 may further include a read only memory (ROM) 720 or other static storage device coupled to the bus 705 for storing static information and instructions for the processor 710. A storage device 725, such as a solid state device, magnetic disk or optical disk, is coupled to the bus 705 for persistently storing information and instructions.

The computing system 700 may be coupled via the bus 705 to a display 735, such as a liquid crystal display, or active matrix display, for displaying information to a user. An input device 730, such as a keyboard including alphanumeric and other keys, may be coupled to the bus 705 for communicating information, and command selections to the processor 710. In another arrangement, the input device 730 has a touch screen display 735. The input device 730 can include any type of biometric sensor, a cursor control, such as a mouse, a trackball, or cursor direction keys, for communicating direction information and command selections to the processor 710 and for controlling cursor movement on the display 735.

In some arrangements, the computing system 700 may include a communications adapter 740, such as a networking adapter. Communications adapter 740 may be coupled to bus 705 and may be configured to enable communications with a computing or communications network 130 and/or other computing systems. In various illustrative arrangements, any type of networking configuration may be achieved using communications adapter 740, such as wired (e.g., via Ethernet), wireless (e.g., via WiFi, Bluetooth, and so on), satellite (e.g., via GPS) pre-configured, ad-hoc, LAN, WAN, and so on.

According to various arrangements, the processes that effectuate illustrative arrangements that are described herein can be achieved by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement may also be employed to execute the instructions contained in main memory 715. In alternative arrangements, hard-wired circuitry may be used in place of or in combination with software instructions to implement illustrative arrangements. Thus, arrangements are not limited to any specific combination of hardware circuitry and software.

That is, although an example processing system has been described in FIG. 7, arrangements of the subject matter and the functional operations described in this specification can be carried out using other types of digital electronic circuitry, or in computer software embodied on a tangible medium, firmware, or hardware, including the structures disclosed in this specification and their structural equivalents, or in combinations of one or more of them. Arrangements of the subject matter described in this specification can be implemented as one or more computer programs, e.g., one or more subsystems of computer program instructions, encoded on one or more computer storage medium for execution by, or to control the operation of, data processing apparatus. Alternatively or in addition, the program instructions can be encoded on an artificially-generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The terms "data processing system" or "processor" encompass all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more subsystems, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD¬ROM and DVD-ROM disks. The processor and the memory can be supplemented by, or incorporated in, special purpose logic circuitry.

To provide for interaction with a user, arrangements of the subject matter described in this specification can be carried out using a computer having a display device, e.g., a QLED (quantum dot display), OLED (organic light-emitting diode), or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile input, or other biometric information. In addition, a computer can interact with a user by sending documents to and receiving documents from a device that is used by the user; for example, by sending web pages to a web browser on a user's client device in response to requests received from the web browser.

Arrangements of the subject matter described in this specification can be carried out using a computing system that includes a back-end component, e.g., as a data server, or that includes a middleware component, e.g., an application server, or that includes a front-end component, e.g., a client computer having a graphical user interface or a web browser through which a user can interact with an arrangement of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter¬network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some arrangements, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative arrangements, the features disclosed herein may be implemented on a smart television circuit (or connected television circuit, hybrid television circuit, and so on), which may include a processing circuit configured to integrate Internet connectivity with more traditional television programming sources (e.g., received via cable, satellite, over-the-air, or other signals). The smart television circuit may be physically incorporated into a television set or may include a separate device such as a set-top box, Blu-ray or other digital media player, game console, hotel television system, and other companion device. A smart television circuit may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television circuit may be configured to provide a home screen or top level screen including icons for a plurality of different applications, such as a web browser and a plurality of streaming media services, a connected cable or satellite media source, other web "channels," and so on. The smart television circuit may further be configured to provide an electronic programming guide to the user. A companion application to the smart television circuit may be operable on a mobile computing device to provide additional information about available programs to a user, to allow the user to control the smart television circuit, and so on. In alternate arrangements, the features may be implemented on a laptop computer or other personal computer, a smartphone, other mobile phone, handheld computer, a tablet PC, or other computing device.

While this specification contains many specific arrangement details, these should not be construed as limitations on the scope of the present disclosure or of what may be claimed, but rather as descriptions of features specific to particular arrangements of the present disclosure. Certain features that are described in this specification in the context of separate arrangements can also be carried out in combination or in a single arrangement. Conversely, various features that are described in the context of a single arrangement can also be carried out in multiple arrangements, separately, or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

Additionally, features described with respect to particular headings may be utilized with respect to and/or in combination with illustrative arrangement described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the arrangements described above should not be understood as requiring such separation in all arrangements, and it should be understood that the described program components and systems can generally be integrated together in a single software product or packaged into multiple software products embodied on tangible media.

Thus, particular arrangements of the subject matter have been described. Other arrangements are within the scope of the following claims. In some cases, the actions recited in the claims can be performed in a different order and still achieve desirable results. In addition, the processes depicted in the accompanying figures do not necessarily need the particular order shown, or sequential order, to achieve desirable results. In certain arrangements, multitasking and parallel processing may be advantageous.

What is claimed is:

1. A method of tracking a plurality of assets on a distributed ledger network, the method comprising:
    receiving, by a computing system, a request to track a specific asset comprising a dataset in an exchange on the distributed ledger network;
    identifying, by the computing system, a predefined action of the exchange, wherein the predefined action is identified from a set of predefined actions, the set of predefined actions corresponding with a list of actions for exchanging assets of asset type associated with the specific asset;
    generating, by the computing system, a unique tracking identifier by combining a subset of identifiers comprising an asset issuer identifier, an asset type identifier, and a unique identifier into the unique tracking identifier, wherein the unique tracking identifier corresponds with an ownership percentage of the specific asset;
    generating, by the computing system, a cryptographic code unique to the specific asset, the cryptographic code comprising the asset issuer identifier, the asset type identifier, the unique identifier, and metadata of the specific asset based on executing a cryptographic hash, wherein the cryptographic code is structured to identify the metadata of the specific asset and uniquely identify the specific asset;
    identifying, by the computing system, a reason for the exchange from the set of predefined actions corresponding with the asset type;
    providing, by the computing system to the distributed ledger network, the cryptographic code and the reason for the exchange, wherein providing comprises executing a smart contract, the smart contract comprises program code that causes the distributed ledger network to execute a set of instructions updating the specific asset and the dataset; and
    receiving, by the computing system from the distributed ledger network, a confirmation notification indicating a successful association of the unique tracking identifier with the specific asset.

2. The method of claim 1, further comprising:
    receiving, by the computing system, a notification indicating the exchange of the unique tracking identifier not on the distributed ledger network and including the reason for the exchange.

3. The method of claim 1, wherein each identifier of the subset of identifiers is a predetermined length such that the unique tracking identifier is a fixed length and corresponds with the specific asset while stored on the distributed ledger network.

4. The method of claim 1, wherein the distributed ledger network is configured with a plurality of nodes, wherein each node of the plurality of nodes stores each dataset associated with each asset on the distributed ledger network.

5. The method of claim 1, further comprising:
    retrieving, by the computing system from the distributed ledger network, the dataset based on providing the unique tracking identifier of the specific asset; and
    determining, by the computing system, each update of a plurality of updates of the dataset associated with the unique tracking identifier.

6. The method of claim 5, further comprising:
    receiving, by the computing system, a request to report each update of the unique tracking identifier; and
    reporting, by the computing system, a timeline of update data of the specific asset based on the unique tracking identifier.

7. The method of claim 1, wherein the computing system is a node of a plurality of nodes on the distributed ledger network, and wherein the plurality of nodes are interconnected via a peer-to-peer network.

8. The method of claim 1, wherein the specific asset is at least one of a digital currency based on a unit of fiat currency, a physical asset, a financial institution instrument, or confidential information.

9. The method of claim 1, the unique tracking identifier further comprises a subset identifier corresponding to at least one of a duration, biometric information, geolocation information, or a fractional ownership percentage, and wherein the unique tracking identifier further comprises biological or behavioral characteristic information of the specific asset.

10. A system comprising:
    at least one processing circuit configured to:
        receive a request to track a specific asset comprising a dataset in an exchange on a distributed ledger network;
        identify predefined action of the exchange, wherein the predefined action is identified from a set of predefined actions, the set of predefined actions corresponding with a list of actions for exchanging assets of asset type associated with the specific asset;
        generate a unique tracking identifier, the unique tracking identifier by combining a subset of identifiers comprising an asset issuer identifier, an asset type identifier, and a unique identifier into the unique tracking identifier, wherein the unique tracking identifier corresponds with an ownership percentage of the specific asset;
        generate a cryptographic code unique to the specific asset, the cryptographic code comprising the asset issuer identifier, the asset type identifier, the unique identifier, and metadata of the specific asset based on executing a cryptographic hash, wherein the cryptographic code is structured to identify the metadata of the specific asset and uniquely identify the specific asset;
        identify a reason for the exchange from the set of predefined actions corresponding with the asset type;
        provide, to the distributed ledger network, the cryptographic code and the reason for the exchange, wherein providing comprises executing a smart contract, the smart contract comprises program code that causes the distributed ledger network to execute a set of instructions updating the specific asset and the dataset; and receive, from the distributed ledger network, a confirmation notification indicating a successful association of the unique tracking identifier with the specific asset.

11. The system of claim 10, wherein the at least one processing circuit is further configured to: receive a notification indicating the exchange of the unique tracking identifier not on the distributed ledger network and including the reason for the exchange.

12. The system of claim 10, wherein each identifier of the subset of identifiers is a predetermined length such that the unique tracking identifier is a fixed length and corresponds with the specific asset while stored on the distributed ledger network.

13. The system of claim 10, wherein the distributed ledger network is configured with a plurality of nodes, wherein each node of the plurality of nodes stores each dataset associated with each asset on the distributed ledger network.

14. The system of claim 10, wherein the at least one processing circuit is further configured to: retrieve, from the distributed ledger network, the dataset based on providing the unique tracking identifier of the specific asset; and
determine each update of a plurality of updates of the dataset associated with the unique tracking identifier.

15. The system of claim 14, wherein the at least one processing circuit is further configured to:
receive a request to report each update of the unique tracking identifier; and
report a timeline of update data of the specific asset based on the unique tracking identifier.

16. The system of claim 10, wherein the system is a node of a plurality of nodes on the distributed ledger network, and wherein the plurality of nodes are interconnected via a peer-to-peer network.

17. The system of claim 10, wherein the specific asset is at least one of a digital currency based on a unit of fiat currency, a physical asset, a financial institution instrument, or confidential information.

18. The system of claim 10, the unique tracking identifier further comprises a subset identifier corresponding to at least one of a duration, biometric information, geolocation information, or a fractional ownership percentage, and wherein the unique tracking identifier further comprises biological or behavioral characteristic information of the specific asset.

19. One or more non-transitory computer-readable storage media having instructions stored thereon that, when executed by at least one processing circuit, cause the at least one processing circuit to:

receive a request to track a specific asset comprising a dataset in an exchange on a distributed ledger network;
identify predefined action of the exchange, wherein the predefined action is identified from a set of predefined actions, the set of predefined actions corresponding with a list of actions for exchanging assets of asset type associated with the specific asset;
generate a unique tracking identifier, the unique tracking identifier by combining a subset of identifiers comprising an asset issuer identifier, an asset type identifier, and a unique identifier into the unique tracking identifier, wherein the unique tracking identifier corresponds with an ownership percentage of the specific asset;
generate a cryptographic code unique to the specific asset, the cryptographic code comprising the asset issuer identifier, the asset type identifier, the unique identifier, and metadata of the specific asset based on executing a cryptographic hash, wherein the cryptographic code is structured to identify the metadata of the specific asset and uniquely identify the specific asset;
identify a reason for the exchange from the set of predefined actions corresponding with the asset type;
provide, to the distributed ledger network, the cryptographic code and the reason for the exchange, wherein providing comprises executing a smart contract, the smart contract comprises program code that causes the distributed ledger network to execute a set of instructions updating the specific asset and the dataset; and
receive, from the distributed ledger network, a confirmation notification indicating a successful association of the unique tracking identifier with the specific asset.

20. The one or more non-transitory computer-readable storage media of claim 19, having additional instructions stored thereon that, when executed by the at least one processing circuit, cause the at least one processing circuit to:
retrieve, from the distributed ledger network, the dataset based on providing the unique tracking identifier of the specific asset;
determine each update of a plurality of updates of the dataset associated with the unique tracking identifier;
receive a request to report each update of the unique tracking identifier; and
report a timeline of update data of the specific asset based on the unique tracking identifier.

\* \* \* \* \*